United States Patent Office 3,086,931
Patented Apr. 23, 1963

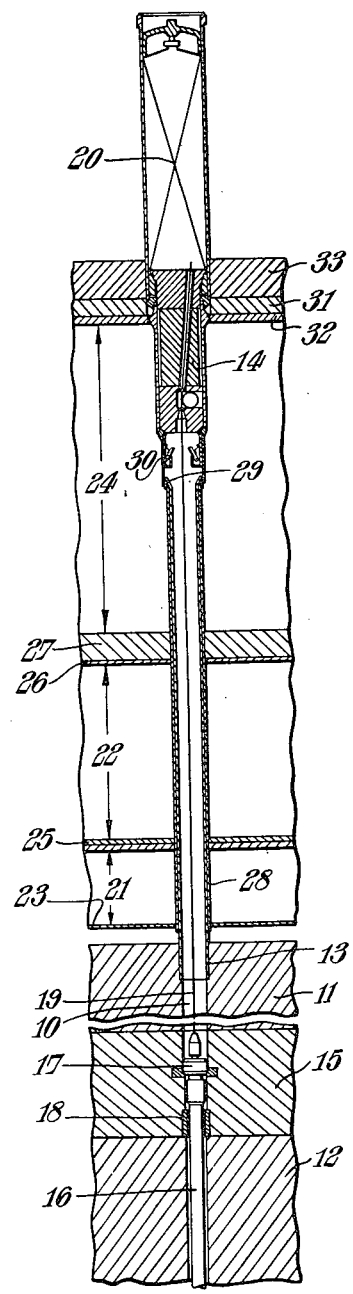

3,086,931
NEUTRON SHIELDING FOR NUCLEAR REACTORS
Everett Long, Culcheth, near Warrington, and Jack Jones, Manchester, England, assignors to United Kingdom Atomic Energy Authority, London, England
Filed June 24, 1958, Ser. No. 744,175
Claims priority, application Great Britain June 24, 1957
1 Claim. (Cl. 204—193.2)

This invention relates to nuclear reactors and is concerned with neutron shields therefor. In order to save height in a nuclear reactor design whilst avoiding activation by neutrons of components intimately associated with the reactor core but outside it, it is arranged for a neutron shield to be placed adjacent to the reactor core. However in such a design the neutron shield has to be perforated with holes of a diameter adequate to allow for withdrawal (with good clearance) of control rods. Such holes set up neutron leakage paths thus giving rise to localised activation of the components outside the shield.

According to the present invention in a nuclear reactor having a neutron shield adjacent to the core of the reactor, holes passing through the neutron shield and providing access to the core are extended in a direction away from the core by tubes terminating in neutron shield plugs, the tubes including material having a high neutron absorbing characteristic.

The invention will now be described with reference to the single FIGURE of the accompanying drawing which is a sectional elevation.

Referring to the drawing, a hole 10 through a neutron shield 11 adjacent to a nuclear reactor graphite core 12 and reflector 15 is extended in a direction away from the core 12 by a neutron absorbing tube 13 of boron steel terminating in a neutron shield plug 14.

A control rod 16 is shown fully inserted in the core 12, the control rod 16 having at its top end a broach 17 which engages with a broaching sleeve 18 to arrest the control rod 16 when it is dropped into the core 12 for emergency reactor shut-down. The control rod 16 is normally raised or lowered via a cable 19 passing through the shield plug 14 and driven by a winding mechanism 20.

Situated above the neutron shield 11 there is a moderator cover plate 23, a gas space 21, the bottom insulated plate 25 of a tank 22 divided by a diaphragm 26 (having heat insulation 27) from an upper tank 24. The tank 24 is closed by a cover 31 having a steel insulation layer 32 and coating of lagging 33. An outer tube 28 surrounds the tube 13 where it passes through the tanks 24, 22, and the tube 28 is welded to the plates 25, 26, 31 to stiffen the tanks 24, 22, and the tube 13 has a flanged top end 29 to locate it in the tube 28 from which it is removable. A catch 30 is provided to support the control rod 16 when fully withdrawn. Neutrons escaping into the tube 13 are mostly fast neutrons and are mostly collimated. They therefore strike the tube 13 at low angle of incidence and if they proceed into the tube they traverse a borated path much greater than the tube thickness and they are therefore more likely to be absorbed. Those that reflect from the wall tend to keep in the path of collimation and arrive at the plug 14 where they are absorbed.

The tube 13 is made removable (into a charge machine) as it becomes activated to an extent which would hinder access to other parts of the tanks, etc.

The tube 13 may include other materials having a high neutron absorbing characteristic either in the alloyed state or as discrete particles. The tube 13 can also be made of concentric layers of material, at least one of the layers including material having a high neutron absorbing characteristic—such materials are well known and include boron, cadmium and rare earth metals or compounds.

Reference may be had for a list of such materials to the section relating to "High-Cross-Section Materials" at pages 521 et seq. in The Reactor Handbook, vol. 3, published by the United States Atomic Energy Commission (1955), and materials qualified herein as of "a high neutron absorbing characteristic" may be understood to have a cross-section within the range of this list for any given velocity in the nutron energy spectrum.

This invention has application to a sodium-graphite reactor such as is disclosed in detail in a copending application of even date, Serial No. 744,185, now U.S. Patent No. 3,000,728.

We claim:

A nuclear reactor comprising a reactor core, means defining vertically orientated control rod channels penetrating the core, a neutron shield structure adjacent the core, means defining control rod access passages through the shield structure, tubes of substantial amounts of neutron shielding material extending vertically away from the control rod access passages in a direction away from the core, neutron shield plugs terminating the extended ends of the tubes, control rod manipulating gear disposed above the neutron shield plugs, control rods within the spaces defined by the inner walls of the control rod channels, channel access passages and tubes and control rod moving means penetrating the shield plugs to connect the control rod manipulating gear with the upper ends of the control rods.

References Cited in the file of this patent

UNITED STATES PATENTS

| | | |
|---|---|---|
| 2,807,580 | Fenning et al. | Sept. 24, 1957 |
| 2,863,815 | Moore et al. | Dec. 9, 1958 |

OTHER REFERENCES

Nucleonics, vol. 14 (December 1956), S 24 and S 25.
Nuclear Power, vol. 2 (February 1957), pages 44–46.
Engineer (London), vol. 203 (Feb. 8, 1957), pages 217–218.
The Reactor Handbook (AECD-3647), published by AEC (1955), page 523.
Research Reactors (TID-5275), published by USAEC (1955), pages 180, 356, 360, 415.
Proceedings of the International Conference on the Peaceful Uses of Atomic Energy, Aug. 8–20, 1955, vol. 2, page 82.